Oct. 24, 1961     J. C. ELLIOTT     3,005,700

METAL FOAMING PROCESS

Original Filed May 26, 1958

INVENTOR.
JOHN C. ELLIOTT
BY
*Attorney*

United States Patent Office 3,005,700
Patented Oct. 24, 1961

3,005,700
METAL FOAMING PROCESS
John C. Elliott, Anaheim, Calif., assignor, by mesne assignments, to Lor Corporation, a corporation of Delaware
Continuation of application Ser. No. 737,832, May 26, 1958. This application Mar. 14, 1960, Ser. No. 14,993
2 Claims. (Cl. 75—20)

This invention relates to apparatus for making metal foam and more particularly to a device of the type indicated having means for metering the rate at which metal to be foamed is fed into the reaction chamber of the apparatus.

This is a continuation application of my co-pending application having Serial No. 737,832 filed May 26, 1958, now abandoned, which is a continuation-in-part of my application Serial No. 629,930 filed December 21, 1956, now abandoned.

Metals which may be suitably foamed to provide a strong, light-weight cellular foam include aluminum, magnesium, steel, and copper. Various shapes may be used such as pellets, compressed balls, powder, bars, cylinders, turnings, strips, which present a relatively large surface area for ease in melting metal in preparation for admixture with a foaming agent which may be a hydride or alloy of a hydride. The foaming agent itself may be added to the molten metal in a variety of forms, as compressed balls, pellets, briquettes and the like but is preferably added as a powder. However, there has not been available any means of controlling the relative rates of feed of metal and powder so that the proper proportions of each will be introduced continuously into a reaction chamber for producing a uniform metal sponge.

Accordingly, it is an object of the invention to provide means by which the metal to be foamed can be easily metered into the device at a desired rate of speed in accordance with the calibrated capacity thereof by means of the force of gravity.

Another object is to provide apparatus of the type indicated which is adapted for use with varying types of metals and foaming agents such as pebbles, bars, rods, pellets, briquettes and the like.

Another object is to provide means for introducing a foaming agent into foaming relation with the metal at a controlled rate. Further objects will become apparent as the invention is described.

Figure 1:
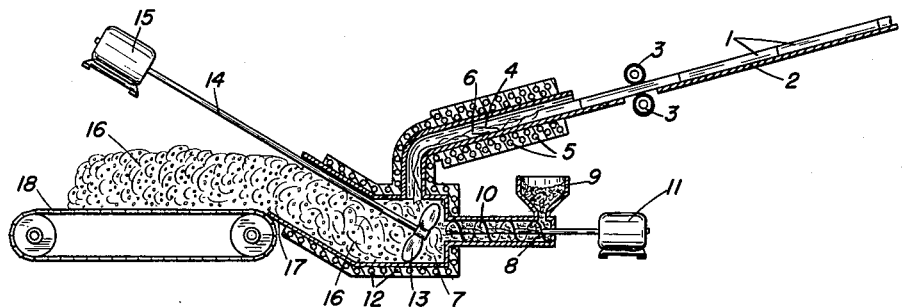
Figure 2:
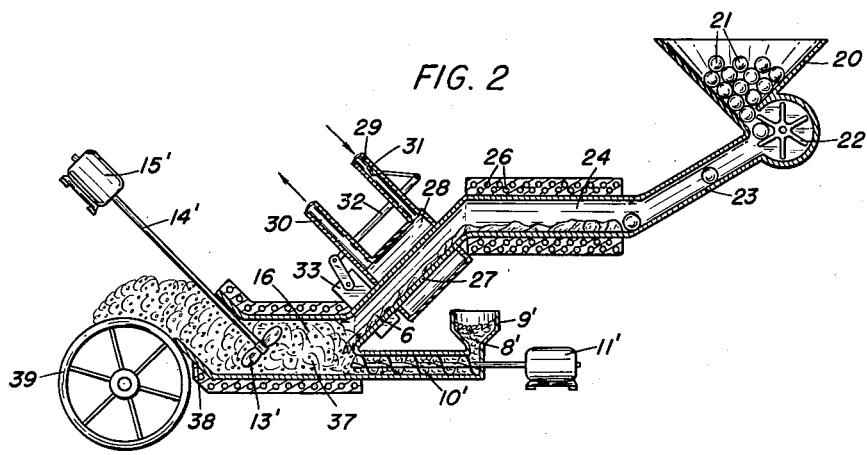
Figure 3:
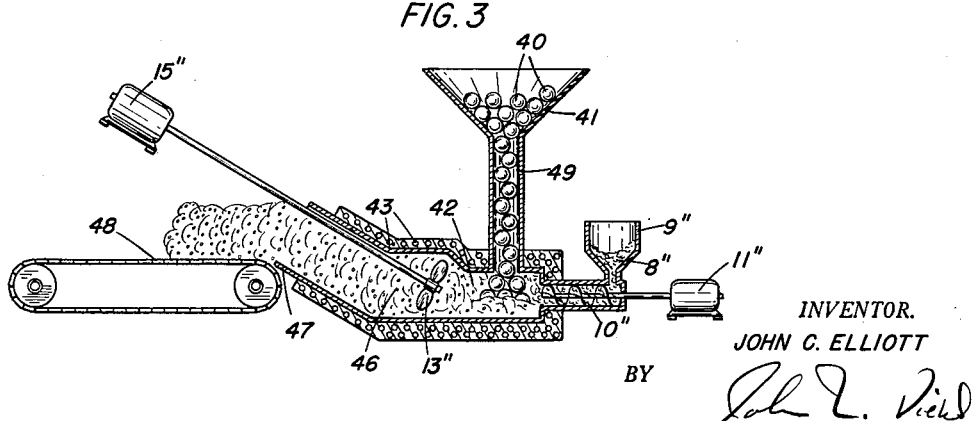

FIGURE 1 is a cross-sectional view of the invention;
FIGURE 2 is another cross-sectional view of the invention;
FIGURE 3 is another cross-sectional view of the invention.

In the form of the invention disclosed in FIGURE 1 aluminum rods or ingots 1 slide downward on an inclined chute 2 by means of the force of gravity their rate of travel being controlled by feed rolls 3 which thereby meter the aluminum. The rods travel thence into a heating zone 4 which may be maintained at a temperature above the melting point of the metal by means of induction coils 5 to thereby melt the metal. The melting metal 6 flows downward thru an enclosing means into a mixing or reaction chamber 7 by means of the force of gravity. A powdered foaming agent 8 contained in hopper 9 is introduced into chamber 7 by helical conveyor 10 driven by motor 11. Chamber 7 may be heated by induction coils 12. The melted metal 6 and foaming agent 8 are agitated with a stirring device such as beater or propellor blades 13 on the end of a shaft 14 driven by a motor 15. The foaming agent decomposes upon contact with the molten metal and releases gas which causes the metal to form a metal foam 16 which expands up the inclined foaming throat 17 onto a conveyor belt 18 adapted to carry out the foam away from chamber 7.

The inclined chute 2 may be made from alumina or other ceramic or cast iron or other suitable metal or refractory material and may if desired be enclosed within a heating coil. Alternately, heat may be supplied by enclosing chute 2 and mixing chamber 7 within a furnace (not shown) constructed of fire brick or other refractory material and heated with a plurality of gas or oil burners. Also, electrodes (not shown) may be provided for conducting a current of electricity directly through the batch in order to generate heat the construction of which may be conventional. In any case the feed rolls 3 and screw 10 may be driven at a complementary predetermined rate for producing a uniform foam.

In the form of the invention disclosed in FIGURE 2 an open hopper 20 is filled with compressed metallic balls or pellets 21 which are metered into inclined chute 23 by means of a revolving spoked-wheel 22. The balls or pellets 21 may pass by means of the force of gravity, thence to horizontal melting zone 24 which may be flushed with an inert gas to prevent oxidation of the metal balls. The horizontal melting zone 24 may be heated by coils 26 or by a refractory furnace heated with burning gas. Molten metal may thence flow down an inclined chute 27 which may be enclosed in a cooling jacket 28 provided with fluid inlet tube 29 and fluid outlet tube 30. Flow through jacket 28 may be controlled by regulating means comprising a valve or damper 31, operating lever 32, and a thermostat 33. The cooling fluid may be liquid but is preferably a gas and its flow is preferably controlled to provide a temperature suitable for decomposition of the foaming agent and above the melting point of the metal. As a suitable coolant there may be used nitrogen, neon, or other inert gas.

The molten metal flows by means of the force of gravity into mixing chamber 27' simultaneously powdered foaming agent 8' contained in hopper 9' may be introduced into chamber 37 by means of helical conveyor 10' driven by motor 11'. A stirring device comprising blades 13' on shaft 14' driven by motor 15' agitates the mixture of foaming agent and molten metal in chamber 37 to form a metal foam 16 which expands up the upwardly inclined foaming chute 38 onto the outer surface of rotating wheel 39 which may carry the foam away from chute 38. Thus the rate of flow of the metal is metered in accordance with the rate of feed of hydride foaming agent, as with the embodiment of FIGURE 1.

In FIGURE 3 compressed metal balls 40 in open hopper 41 fall by gravitational force through throat 49 into mixing chamber 42. Powdered eutectic hydride 8″ in hopper 9″ sifts upon the helical conveyor 10″ driven by motor 11″ and emptying into the mixing chamber 42 which is encased in heating coils 43 in order to heat the metal and decompose the foaming agent. A stirrer 13″ driven by a motor 15″ agitates and causes liberation of gas which produces metal foam 46 which expands up the inclined chute 47 onto a conveyor belt 48. The diameter of the throat 49 of hopper 41 is proportioned in accordance with the size of balls 40 (or other shapes which may be used) and the size of chamber 42 and the rotational rate and size of screw 10' so that a correctly metered and complementary flow rate is achieved.

It may thus be seen that the apparatus of my invention comprises an inclined chute for conveying a plurality of metal ingots into a heating chamber by means of the force of gravity, the metal ingots each having a front end and a back end and being so arranged that the back end of one ingot abuts and is parallel to the front end of a second ingot to provide a continuous stream of metal ingots into the heating chamber, a heating chamber adapted to melt solid metal to provide molten metal, an enclosing means for allowing the molten metal to fall into a reaction chamber by means of the force of gravity, a reaction chamber, and a means for metering a foaming agent into said reaction chamber, at a rate proportioned to the rate of flow of the metal.

It is thus seen that the invention is broad in scope and is not limited excepting by the claims. Having disclosed my invention I claim:

1. The process of producing foamed metal comprising the steps of melting metal to be foamed, continuously introducing said metal into a reaction chamber by gravity flow, continuously introducing a solid state thermally decomposable foaming agent into said reaction chamber, intimately intermixing said metal and said foaming agent in said reaction chamber, said foaming agent being decomposed by the heat of said metal to cause foaming of said metal, said metal in a state of foaming being transferred from said reaction chamber by expansive force of metal foaming in said chamber, said transferred metal then being cooled to provide solidified foam metal product.

2. The process of claim 1 wherein said foaming agent is metered, and is introduced into said reaction chamber at a rate proportional to the rate of introduction of said metal into said chamber.

References Cited in the file of this patent

UNITED STATES PATENTS

| | | |
|---|---|---|
| 2,191,658 | Haux | Feb. 27, 1940 |
| 2,261,022 | Fox et al. | Oct. 28, 1941 |
| 2,354,807 | Fox et al. | Aug. 1, 1944 |
| 2,395,458 | Cape | Feb. 26, 1946 |
| 2,751,289 | Elliott | June 19, 1956 |
| 2,937,938 | Fiedler et al. | May 24, 1960 |

FOREIGN PATENTS

| | | |
|---|---|---|
| 615,147 | France | Dec. 30, 1926 |
| 811,814 | Great Britain | Apr. 15, 1959 |